(12) United States Patent
Royer et al.

(10) Patent No.: US 6,601,626 B2
(45) Date of Patent: Aug. 5, 2003

(54) CROWN REINFORCEMENT FOR A RADIAL TIRE

(75) Inventors: Thierry Royer, La Roche Blanche (FR); Fernando Suarez, Menetrol (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/953,648

(22) Filed: Sep. 17, 2001

(65) Prior Publication Data

US 2002/0005239 A1 Jan. 17, 2002

Related U.S. Application Data

(63) Continuation of application No. PCT/EP00/01318, filed on Feb. 17, 2000.

(30) Foreign Application Priority Data

Mar. 17, 1999 (FR) .............................. 99 03415

(51) Int. Cl.$^7$ .............................. B60C 9/18; B60C 9/22; B60C 9/28
(52) U.S. Cl. .................. 152/526; 152/527; 152/531; 152/533; 152/535; 152/538
(58) Field of Search ................ 152/526, 531, 152/533, 535, 536, 527, 538

(56) References Cited

U.S. PATENT DOCUMENTS

| | | | | |
|---|---|---|---|---|
| 4,732,199 A | * | 3/1988 | Kajiwara | 152/531 |
| 4,934,428 A | * | 6/1990 | Aoki et al. | 152/532 |
| 4,947,915 A | * | 8/1990 | Panikkar et al. | 152/531 |
| 5,772,810 A | | 6/1998 | Cluzel | 152/531 |
| 6,125,900 A | | 10/2000 | De Loze de Plaisance et al. | 152/531 |

FOREIGN PATENT DOCUMENTS

| | | | |
|---|---|---|---|
| EP | 0887208 | | 12/1998 |
| JP | 01240303 | * | 9/1989 |
| JP | 03016805 | * | 1/1991 |
| JP | 03016808 | * | 1/1991 |

* cited by examiner

*Primary Examiner*—Jeff H. Aftergut
*Assistant Examiner*—Justin Fischer
(74) *Attorney, Agent, or Firm*—Baker Botts L.L.P.

(57) ABSTRACT

An aircraft tire, having a radial carcass reinforcement surmounted radially to the outside by a crown reinforcement and a tread, said crown reinforcement including:

a) at least one ply of reinforcement elements of high modulus oriented circumferentially, b) two plies having ends free of reinforcement elements of high modulus, which are parallel to each other within each ply and are crossed from one ply to the next, forming with the circumferential direction an angle α, of between 5° and 35°, and c) radially to the outside, an assembly of at least two layers of textile elements of low modulus which are oriented relative to the circumferential direction at an angle β, of between 0° and 35°, said two layers being obtained by winding in a zigzag a strip, formed of at least one coated cable, and the assembly of the layers having an axial width greater than the width of the tread, whereas the widths of the textile plies of high modulus are less than said width of the tread.

7 Claims, 2 Drawing Sheets

CROWN REINFORCEMENT FOR A RADIAL TIRE

This is a continuation of pending PCT/EP00/01318, filed Feb. 17, 2000.

BACKGROUND OF THE INVENTION

The invention relates to a tire, intended to bear heavy loads and be inflated to very high pressure, greater than 12 bar, such as for example an aircraft tire.

A tire which meets the above criteria has been used for a long time is composed of a radial carcass reinforcement, formed of one or more plies of textile reinforcement elements, which plies are generally divided into two groups: a first group, referred to as axially inner plies, which are anchored within each bead to at least one bead wire by winding around said bead wire, from the inside to the outside to form ply upturns; and a second group referred to as axially outer plies, the radially inner ends of which are generally arranged within each bead beneath the bead wire. Said radial carcass reinforcement is radially surmounted by a crown reinforcement formed of a plurality of layers of textile reinforcement elements which are inclined relative to the circumferential direction by a certain angle $\alpha$. So as to avoid the free ends of crown plies, said layers are obtained by winding, around a form, whether cylindrical or rounded, or a carcass reinforcement blank, a strip of at least one textile reinforcement element from one edge of the layer to the other, forming the desired angle with the equatorial plane.

The textile elements commonly used are of aliphatic polyamide, and have relatively poor tensile strength characteristics, which is why numerous plies are used. As for numerous tires, the use of aromatic polyamide or other similar material as material for reinforcing the crown reinforcement may prove advantageous in an aircraft tire, owing to the properties of said material. However, it is not easy to use such a material, and its use has numerous problems. For example, it is virtually impossible to use it in a crown reinforcement such as described above, obtained by winding a strip in a zigzag: the curvatures adopted by the strip, and hence by the reinforcement elements at the edge of the layer, impart to said elements very major tensions and compressions which, combined with the fact that the aromatic polyamide has resistances to said stresses which deteriorate with temperature, cancel out all the advantages of the aromatic polyamide.

A crown reinforcement, with plies, the edges of which are folded over on themselves, is also scarcely conceivable owing to the curvatures and adhesion to the rubber which is inferior to that of an aliphatic polyamide.

SUMMARY OF THE INVENTION

The object of the invention is to permit the use of aromatic polyamide as material for the main reinforcement elements of a crown reinforcement, by adapting the architecture of said reinforcement to the material.

The aircraft tire according to the invention, comprising a radial carcass reinforcement surmounted radially to the outside by a crown reinforcement and a tread, is characterized in that said crown reinforcement is composed:

a) of at least one ply of textile reinforcement elements oriented circumferentially, the secant modulus of extension of an element being at least equal to 200 cN/tex b) of at least two plies having ends free of textile reinforcement elements, which are parallel to each other within each ply and are crossed from one ply to the next, forming with the circumferential direction an angle $\alpha$, of between 5° and 35°, the secant modulus of extension of an element being at least equal to 200 cN/tex, and c) radially to the outside, of at least two layers of textile reinforcement elements oriented relative to the circumferential direction at an angle $\beta$, of between 0° and 35°, the secant modulus of extension of an element being at most equal to 200 cN/tex, and said two layers being obtained by winding a strip, formed of at least one element coated with rubber mix, from one edge of said layers to the other, the assembly of said layers having an axial width greater than the tread width, whereas the widths of the plies formed of textile elements of high modulus are less than said tread width.

"Width of the tread" is to be understood to mean the width, measured in the radial plane of the axis of the fitted wheel, of the contact surface between the tire mounted on its operating rim, inflated to the recommended pressure and bearing its standardised load.

"Circumferentially oriented elements" is to be understood to mean elements forming with the circumferential direction angles which may be between 0° and 10°.

The secant modulus of extension $M_a$ of a reinforcement element is calculated for the assemblies in accordance with the equation:

$$M_a = F/\epsilon \cdot 1/T_i$$

with F: force to which the assembly is subjected for a relative elongation of 4%, $\epsilon$: the relative elongation, equal to 4%, Ti: linear density, expressed in Tex, of the assembly.

An element having a secant modulus greater than 200 cN/tex is referred to as an element of high modulus.

Preferably, the ply (plies) of circumferential elements is (are) directly located on the carcass reinforcement, and is (are) obtained by helical winding of a strip formed of at least one reinforcement element of aromatic polyamide, said element being coated with suitable rubber mix.

The plies formed of elements oriented at the angle $\alpha$, radially above the ply (plies) of circumferential elements, are also preferably formed of cables of aromatic polyamide and have axial widths which differ from each other but which are greater than the width(s) of said plies of circumferential elements while remaining less than the width of the tread.

All of the layers of the textile elements, having a modulus at most equal to 200 cN/tex, may be formed of cables of aliphatic polyamide, which are oriented relative to the circumferential direction at an angle $\beta$, or of what are called hybrid cables, for example cables formed of two cords of aromatic polyamide and one cord of aliphatic polyamide, oriented in the same manner. Said assembly will preferably have an axial width such that the edges of said assembly are coupled to the carcass reinforcement over a developed width at least equal to 10% of said axial width. "Edge coupled to the carcass reinforcement" is to be understood to mean an edge in contact over a certain length with said reinforcement and separated from said reinforcement by a thickness of rubber equal to the total of the greater and lesser thicknesses respectively of the calendering layers of the final carcass reinforcement ply and the layer of the assembly in contact with said final ply. The above variant permits a distinct improvement in the endurance of the crown reinforcement from the point of view of inter-ply separations, and also higher speed, while permitting an increase in the bursting pressure of the tire, as well as better uniformity of said tire, in particular from the cyclic point of view, which minimizes abnormal tread wear.

As is known per se, and although in the case of small dimensions the assembly of the layers of the reinforcement elements of a modulus at most equal to 200 cN/tex may advantageously play the role of protective layers, the crown reinforcement thus claimed will be advantageously finished off by at least one protective ply formed of metallic elements which undulate in the plane of the ply, said ply being located radially to the outside of the assembly of the layers of cables of aliphatic polyamide.

The invention will be more fully understood with reference to the accompanying drawings.

DESCRIPTION OF PREFERRED EMBODIMENTS

Figure 1:
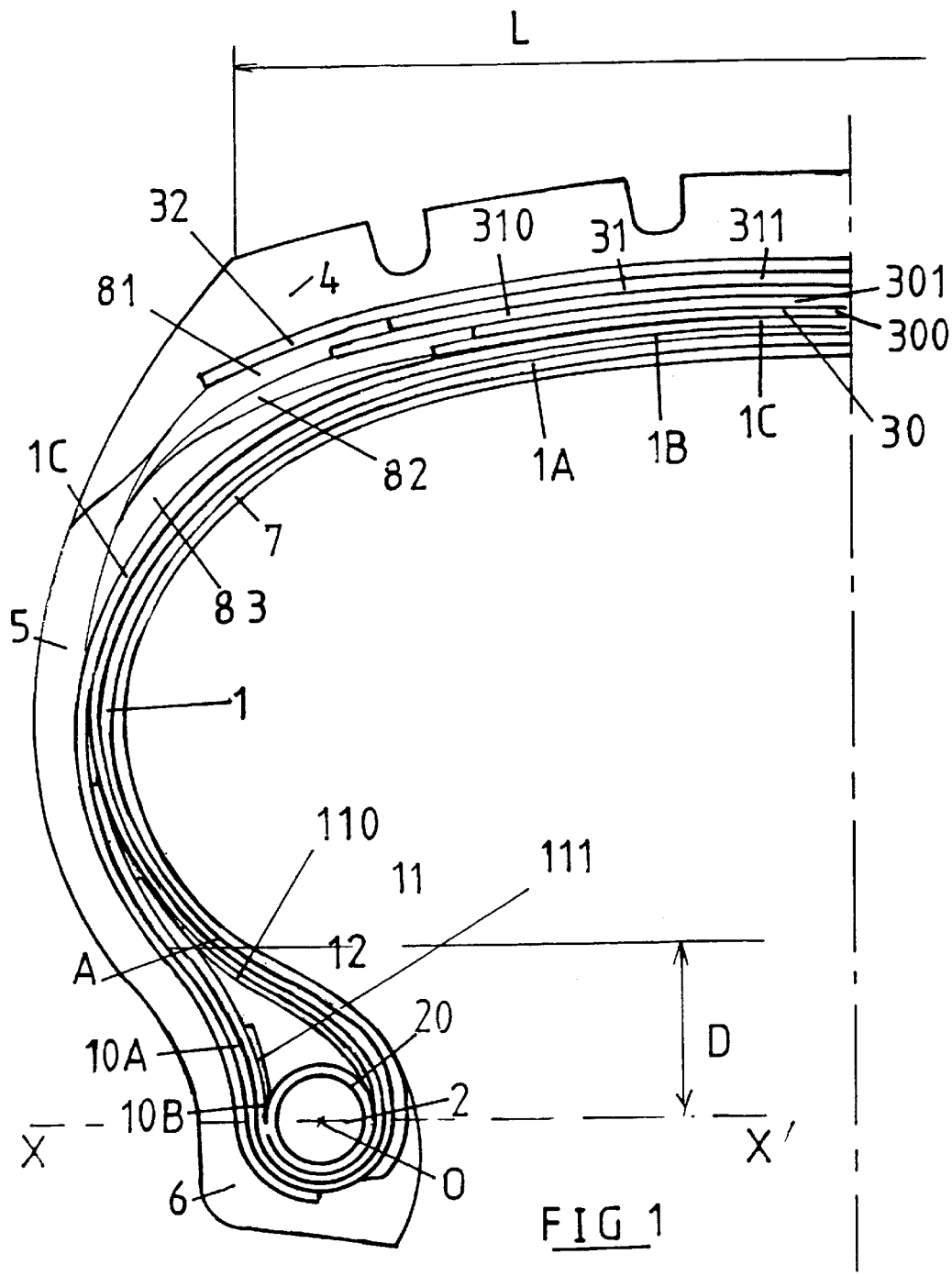
FIG. 1 shows, viewed in meridian section, an aircraft tire according to the invention.

The example described is that of a tire of standardized dimension 29×7.7 R 15 (standards of the Tire and Rim Association). The carcass reinforcement 1 is formed of three plies 1A to 1C of radial textile cables. "Radial cables" is to be understood to mean cables forming with the circumferential direction of the tire angles which may be within the range 90°±10°. Of these three plies, two axially inner plies 1A, 1B are wound within each bead around a bead wire 2 having, in the case in question, a circular cross-section and being coated with a layer 20 of rubber mix of high modulus of elasticity in tension, from the inside to the outside of the tire P to form upturns 10A, 10B.

The section of the bead wire 2 is surmounted radially to the outside by a profiled element or filler 12 of elastomeric mix having substantially the form of a triangle, the apex A of which, which is radially farthest from the axis of rotation of the tire, is located at a distance D from the straight line XX', firstly parallel to said axis of rotation and secondly passing through the geometric center O of the circle circumscribed on the cross-section of the bead wire 2, which circle, in the case described, is identical to the section itself.

The upturns 10A, 10B of the inner carcass plies 1A, 1B have their ends radially distant from the straight line XX' by amounts greater, in the case in question, than the distance D.

The same applies to the radial end of the axially inner strand 110 of the tongue 11, which is composed of radial textile cables identical to the cables of the carcass plies (but which may be different therefrom). As for the radial end of the axially outer strand 111 of the inner tongue 11, it is separated from the straight line XX' by a radial distance less than the distance D.

The so-called outer carcass ply 1C covers, axially to the outside, the upturns 10A, 10B of the inner carcass plies 1A and 1B. The ply 1C is wound around the bead wire 2 over a circular portion or arc corresponding to an angle at the center of the circle circumscribed on the bead wire 2 which is at most equal to 180°, such that the end of this ply 1C is located radially beneath the reference straight line XX'.

The tire bead is finished off, as is known per se, by the sidewall mix 5 and bead protection mix 6, whereas an inner layer 7 forms the inner wall of the tire.

Said carcass reinforcement 1 is surmounted radially by a crown reinforcement 3 of textile cables. This crown reinforcement 3 is formed radially from the inside to the outside by a) a twin ply 30 composed of two plies 300 and 301 of 330×2 textile cables of aromatic polyamide which are arranged circumferentially, each ply being obtained by the helical winding, on the carcass reinforcement blank 1, of a cable coated with rubber, and the respective widths of said two plies 300 and 301 being 95 mm and 85 mm, less than the width L of the tread 4 measured as described above and equal to 130 mm;

b) radially above, a twin ply 31 composed of two plies 310 and 311 which are cut or have free ends, each of said plies 310 and 311 being formed of 167×3 textile cables of aromatic polyamide, said cables being parallel to each other within each ply and crossed from one ply to the next, forming with the circumferential direction an angle α equal to 24°, said plies 310 and 311 having a total thickness of 3.0 mm, and having widths which firstly are unequal and secondly are such that they axially cover the twin ply 30 radially underneath, while remaining less than the width L of the tread 4;

c) radially to the outside, an assembly 32 composed of two angled layers, obtained by winding a strip of 8 textile cables of aliphatic polyamide from one edge of the assembly 32 to the other, forming an angle β of 10° with the circumferential direction, said angle being linked physically on one hand to the number of periods of formation of the assembly 32, and on the other hand to the developed width of said assembly which is far greater than the tread width L since it is equal to 190 mm.

Figure 2:
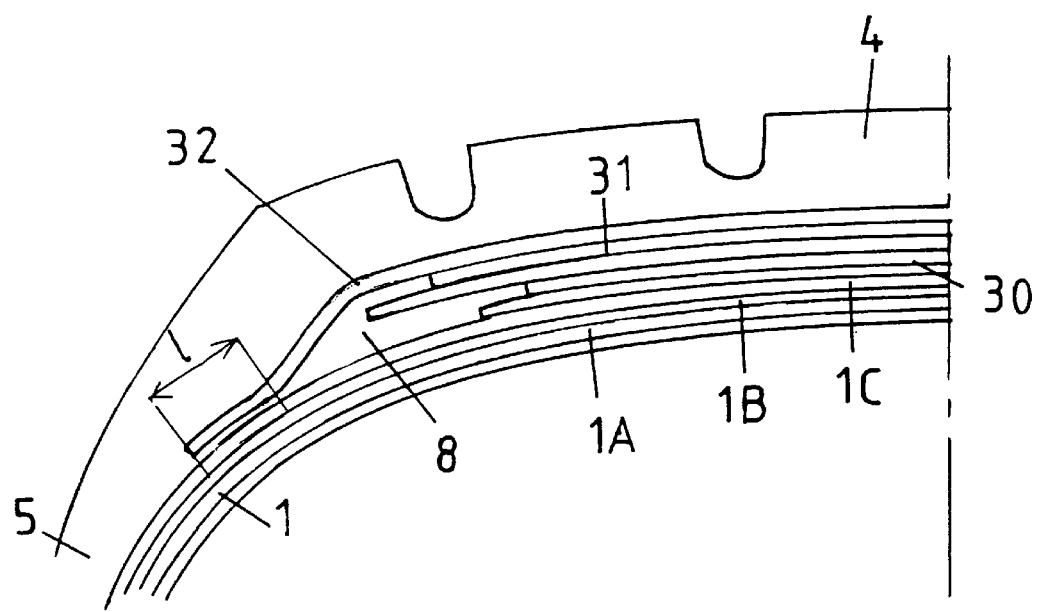
FIG. 2 shows a preferred variant of said tire.

Whereas the edges of the assembly 32 lie radially, in the tire which is shown in FIG. 1, on a complex of rubber mixes such that the rubbers 81 axially extending the twin ply 31, the profiled elements 82 separating the twin ply 31 from the twin ply 30 and extending said twin ply 30 and the profiled elements 83 separating the carcass reinforcement 1 from the crown reinforcement 3, said edges are, in the example of a tire which is shown in FIG. 2, in direct contact, over a certain developed length 1, at least equal to 20 mm and in the case described equal to 30 mm, with the carcass reinforcement 1, the thickness of rubber separating the cables of the radially lower layer of the assembly 32 from the cables of the carcass ply 10C being the total of the thickness of the calendering layer which internally covers the cables of the layer 32 and the thickness of the calendering layer which externally covers the final carcass ply 10C. Edge rubbers and rubber profiled elements, forming an assembly 8, fill the space thus created between the carcass reinforcement 1 and the assembly 32.

We claim:

1. An aircraft tire, comprising a radial carcass reinforcement surmounted radially to the outside by a crown reinforcement and a tread, characterized in that said crown reinforcement comprises:

a) at least one ply of textile reinforcement elements oriented circumferentially, the secant modulus of extension of an element being at least equal to 200 cN/tex b) at least two plies of textile reinforcement elements having ends free, which elements are parallel to each other within each ply and are crossed from one ply to the next, forming with the circumferential direction an angle α, of between 5° and 35° with respect to the equatorial plane of the tire, the secant modulus of extension of an element being at least equal to 200 cN/tex, and c) radially outside of the at least two plies having textile reinforcing elements within a secant modulus of extension at least equal to 200 cN/tex, an assembly of at least two layers of textile reinforcement elements oriented relative to the circumferential direction at an angle β, of between 0° and 35° with respect to the equatorial plane of the tire, the secant modulus of extension of an element being at most equal to 200 cN/tex, and said two layers being obtained by winding a strip, formed of at least one element coated with rubber mix, from one edge of said layers to the other, the assembly of said layers having an axial width greater than the width of the tread, the widths of the plies formed of textile elements with a secant modulus of extension at least equal to 200 cN/tex being less than said width of the tread.

2. A tire according to claim 1, characterized in that the layers of textile elements, the secant modulus of extension of an element of which is at least equal to 200 cN/tex, are layers of elements of aromatic polyamide.

3. A tire according to one of claim 1, characterized in that the layers of textile elements, the secant modulus of which is at most equal to 200 cN/tex and which are obtained by winding from one edge to the other, are formed of cables of aliphatic polyamide.

4. A tire according to claim 1, characterized in that the at least one ply of circumferential elements is located radially on the carcass reinforcement.

5. A tire according to claim 4, characterized in that the at least one ply of circumferential elements is obtained by helical winding of a strip formed of at least one reinforcement element of aromatic polyamide, said element being coated with suitable rubber mix.

6. A tire according to claim 1, characterized in that the plies formed of elements oriented at the angle α, radially above the at least one ply of circumferential elements, have axial widths which differ from each other but which are greater than the width of plies of said at least one ply of circumferential elements while remaining less than the width of the tread.

7. A tire according to claim 2, characterized in that the assembly of layers of elements, the modulus of which is at most equal to 200 cN/tex and which are oriented relative to the circumferential direction at an angle β, has an axial width such that the edges of said assembly are coupled to the carcass reinforcement over a developed length 1 at least equal to 20 mm.

* * * * *